Patented Nov. 15, 1938

2,137,006

UNITED STATES PATENT OFFICE 2,137,006

PROCEDURE TO RENDER ALBUMINOUS ARTIFICIAL STUFFS SOFT AND ELASTIC

Walther Schrauth, Berlin-Dahlem, Germany, assignor to Deutsche Hydrierwerke Aktiengesellschaft, Berlin-Charlottenburg, Germany, a corporation of Germany No Drawing. Application March 30, 1935, Serial No. 13,991. In Germany March 31, 1934

3 Claims. (Cl. 106—38)

It is already known that albuminous artificial materials made of gelatine, size, casein, albumin, are rendered soft and elastic by adding to the said materials higher molecular aliphatic aromatic or cyclo-aliphatic alcohols with 6 or more carbon atoms in the molecule or, respectively, the ethers or esters of these compounds either alone or mixed with each other.

Now it has been found that for the above mentioned purposes it is possible to use likewise with very good results the cyclic hydroxyl-substituted ethers which may also contain several oxygen atoms in the ring and one or more lateral chains, as well as their ethers and esters. The following suitable compounds may be mentioned as examples: acetone-glycerol, acetone-arabite, acetone-mannite, acetophenone-glycerol, cyclohexanone-glycerol, the hydrogenation products of furfurol and particularly of the furfuryl alcohol, tetrahydro furfuryl alcohol and the like. Those products are very fast and insentive to variations of moistness. Moreover they show an excellent softening action and are of a neutral character:

It is practicable to employ the aforesaid products either dissolved or in the form of emulsions; in this case one uses as emulsifying agents e. g., the sulfonates of the fatty alcohols. Of same effect are the ethers and esters made of the mentioned products such as tetrahydrofurfurylacetate, furfurylbenzoate, cyclohexanone-glycerolphthalate, furfurylethylether, acetone-glycerolbutylether.

Example 1

To a concentrated aqueous gelatine solution of the usual composition one incorporates 7.5% of tetrahydrofurfurylalcohol, eventually in the form of an alcoholic solution. The amount of the alcohol to be added has to be such as to prevent any flaking of albumen out of the smelting mass. The gelatine foils or other solid gelatine products obtained by pouring out or by letting solidify the smelting mass, show an excellent elasticity and they are insensitive to moistness.

Instead of the tetrahydrofurfurylalcohol it is also advantageous to use cyclohexanone-glycerolphthalate or acetone-glycerol.

Example 2

An artificial mass of casein showing an excellent elasticity is obtained if, while using the usual manufacturing process, one adds acetone-glycerol-benzoate dissolved in butanol. The thus obtained products, which is of an excellent fastness and resistance to outside influences, can be worked in the usual way into articles for common use and the like. The acetone-glycerol-benzoate may eventually likewise be added in the form of an emulsion made for the use as emulsifying agent by means of fatty alcohol-sulfonate.

Instead of the acetone-glycerol-benzoate one may likewise advantageously employ the acetone-mannite.

The plasticizers herein mentioned serve their function because of physical characteristics but do not react chemically with the albuminous materials to any appreciable extent, if at all.

What I claim is:

1. As a product of manufacture, an albuminous artificial product containing as a softening agent cyclohexanone glycerol.

2. As a product of manufacture, an albuminous artificial product containing as a softening agent acetone-glycerol.

3. As a product of manufacture an albuminous artificial product containing as a softening agent material of the group consisting of acetone-glycerol, acetone-arabite, acetone-mannite, acetophenone-glycerol, cyclohexanone-glycerol, cyclohexanone-glycerol-phthalate and acetone-glycerol-butyl-ether.

WALTHER SCHRAUTH.